No. 781,273. PATENTED JAN. 31, 1905.
H. M. H. DELAMARRE.
INCANDESCENT GAS LAMP.
APPLICATION FILED NOV. 10, 1903.
2 SHEETS—SHEET 1.
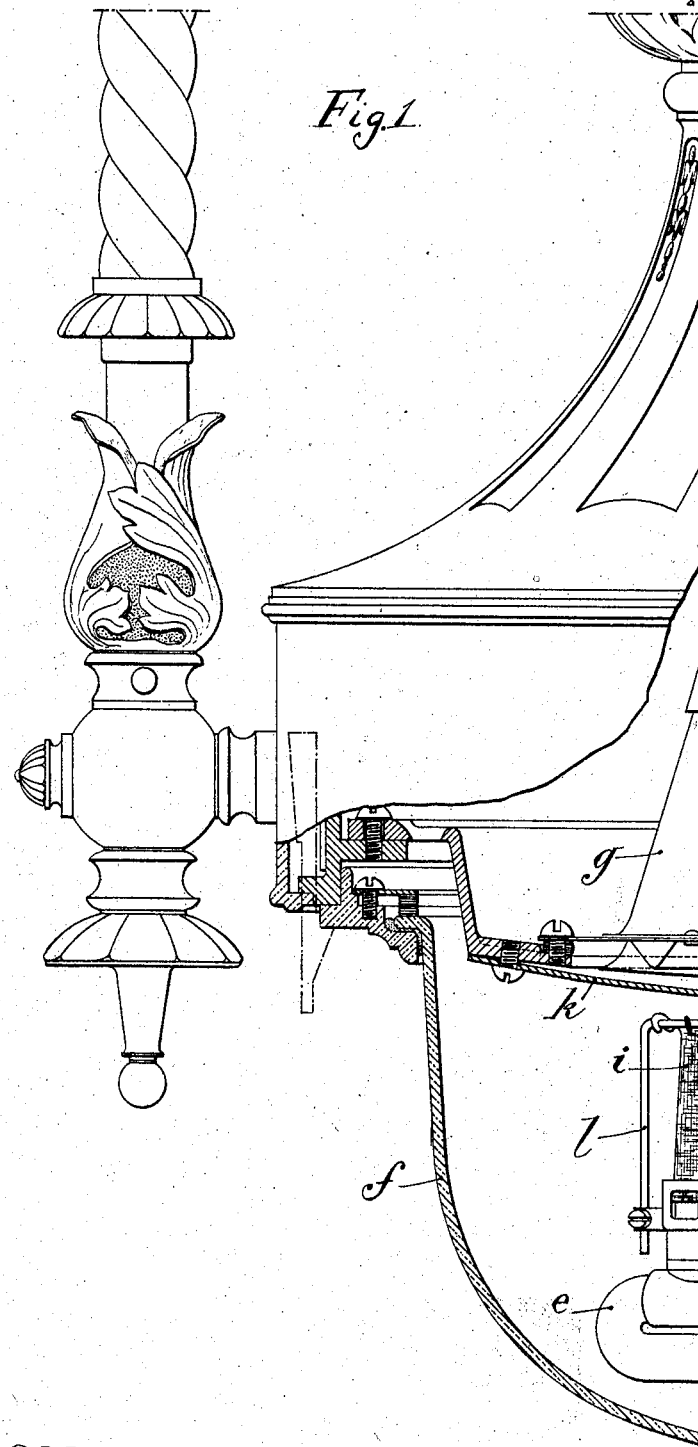

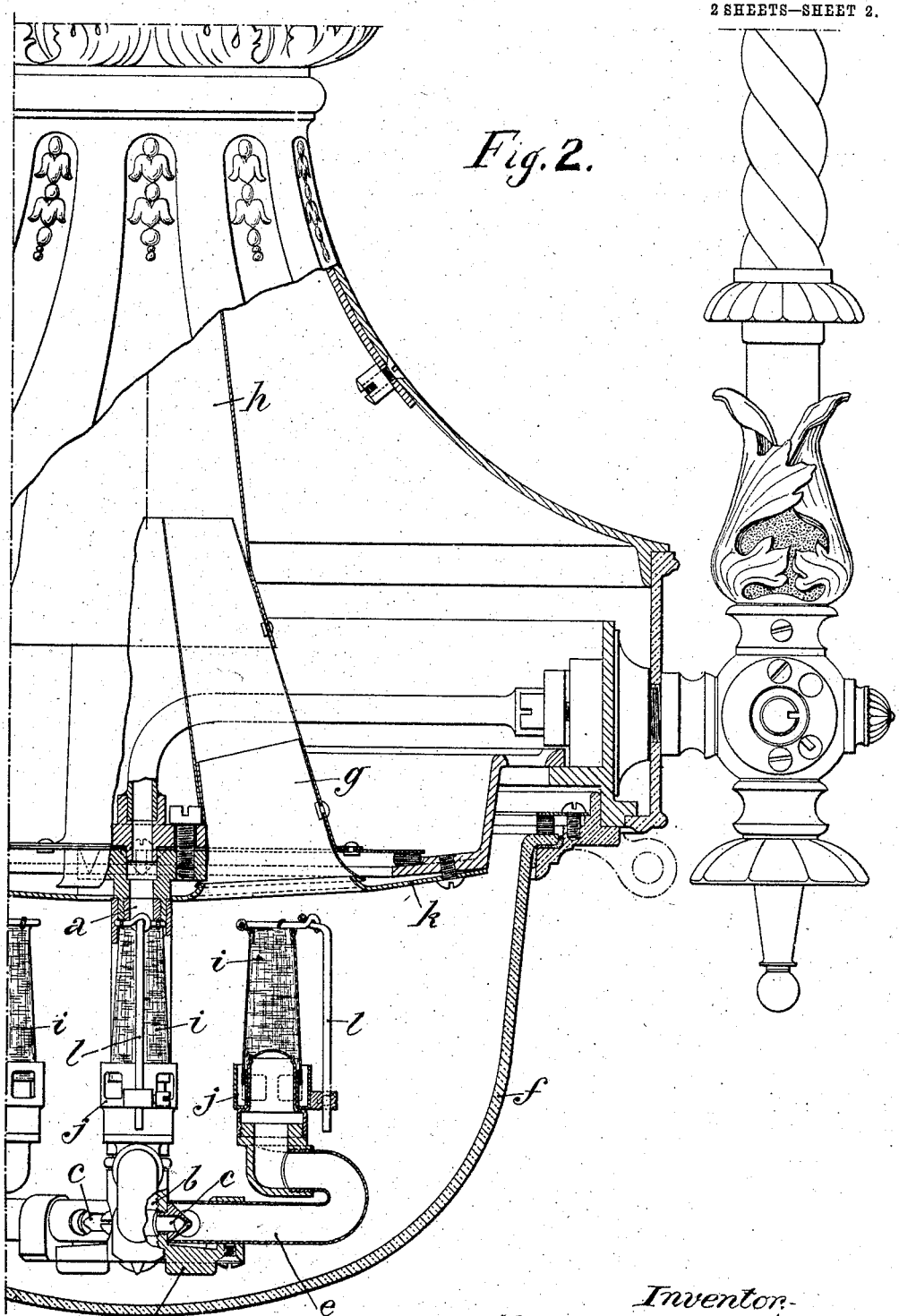

No. 781,273.                                                Patented January 31, 1905.

UNITED STATES PATENT OFFICE.

HENRI MARIE HUBERT DELAMARRE, OF PARIS, FRANCE.

INCANDESCENT GAS-LAMP.

SPECIFICATION forming part of Letters Patent No. 781,273, dated January 31, 1905.

Application filed November 10, 1903. Serial No. 180,563.

*To all whom it may concern:*

Be it known that I, HENRI MARIE HUBERT DELAMARRE, a citizen of the Republic of France, and a resident of 162 Rue Ordener, Paris, France, have invented new and useful Improvements in Incandescent Gas-Lamps, of which the following is a specification.

This invention has for its object devices whereby incandescent gas-burners can be applied to lamps, more particularly those used on railways, in which a cluster of several burners is used.

In railway-carriages it is sometimes necessary to provide for a more powerful illumination than that obtained with lamps having a single burner—for example, in compartments that are larger than the ordinary size, such as saloon-compartments and restaurant-cars.

The present invention consists in arrangements whereby it is rendered possible to combine in one and the same lamp several incandescent burners that are supplied with a mixture of gas and air by means of a separate injector for each burner, each of which is also provided with a separate chimney, so as to insure a regular draft, while at the same time all the burners are brought as close to the center of the lamp as possible in order to intensify the light.

Figures 1 and 2, taken together, represent a central vertical sectional view of a railway-lamp provided with three Bunsen burners. The burner at the right hand in Fig. 2 is shown in section, and the other two are shown entire.

The gas is supplied, through a central tube *a*, protected by a tubular casing of enameled iron, to a central chamber *b*, from which branch the injectors *c* of the Bunsen burners. The latter are secured in their relative positions by a support *d*, having the same number of arms as there are burners, such as three in the present case. For enabling this group of burners to be mounted within the glass *f* without materially increasing the size of the lamp and also in order to bring the burners and their mantles near to the center thereof the tubes *e* of the Bunsen burner are constructed with a bend of the special form as shown. Each burner has a separate chimney *g*, which all open into a chimney *h*, serving as collector for discharging the products of combustion of all the burners. It will be evident that the lamp may be constructed with only two or with more than three burners. A disk of enameled sheet-iron *k*, having openings through which the chimneys pass, serves as reflector. The incandescent mantles *i* are preferably mounted on annular sockets *j* of the form shown. The upper end of the mantle *i* is suspended from a vertical rod *l*, which is connected to the external wall of a double socket *j*, surrounding the top of the burner, while the mantle's base is fitted onto the inner wall of same socket. By that means it is easy to substitute a new mantle for an injured one by merely taking the socket off and replacing it by another one provided with a new mantle. The socket *j* has also the advantage of protecting the base of the mantle, and, moreover, in case the upper part of the latter breaks the socket maintains the remaining part in its normal position until another mantle can be put in place.

Having thus explained my invention, what I claim is—

1. In an incandescent gas-lamp, the combination with a plurality of Bunsen burners, of a central chamber having branching from it injectors one for each burner and having arms below said injectors, a gas-supply pipe to said chamber, and pipes carried by said arms and communicating between said chamber and burners.

2. In an incandescent gas-lamp, the combination with a plurality of Bunsen burners, of a central chamber having branching from it injectors one for each burner, a gas-supply pipe to said chamber, pipes communicating between said chamber and burners, a plurality of chimneys one for each burner and a central collecting-chimney into which the first-named chimneys project upward.

3. In an incandescent gas-lamp, the combination with a plurality of Bunsen burners, of a central chamber having branching from it injectors one for each burner, a gas-supply pipe to said chamber, pipes communicating between said chamber and burners, a reflector above the burners provided with an opening for a chimney over each burner, chimneys fitted to said openings and a central collecting-chimney into which the several chimneys first mentioned project upward.

In testimony that I claim the foregoing as my invention I have signed my name, in presence of two witnesses, this 29th day of October, 1903.

HENRI MARIE HUBERT DELAMARRE.

Witnesses:
AUGUSTUS E. INGRAM,
KLEIDE FABE.